United States Patent [19]

Hamaekers et al.

[11] Patent Number: 5,058,866
[45] Date of Patent: Oct. 22, 1991

[54] HYDRAULICALLY DAMPED MOUNT

[75] Inventors: Arno Hamaekers, Gorxheimertal; Axel Rudolph, Darmstadt, both of Fed. Rep. of Germany

[73] Assignee: Firma Carl Freudenberg, Weinheim, Fed. Rep. of Germany

[21] Appl. No.: 561,728

[22] Filed: Aug. 1, 1990

[30] Foreign Application Priority Data

Aug. 31, 1989 [DE] Fed. Rep. of Germany ....... 3928862

[51] Int. Cl.$^5$ .............................................. F16F 13/00
[52] U.S. Cl. ................................... 267/140.1; 267/219
[58] Field of Search .................... 267/140.1, 219, 152, 267/153; 248/636, 562, 638; 180/300, 312, 902; 280/710

[56] References Cited

U.S. PATENT DOCUMENTS

| | | | |
|---|---|---|---|
| 4,768,760 | 9/1988 | Le Fol | 267/140.1 |
| 4,883,260 | 11/1989 | Kanda | 267/140.1 |
| 4,896,868 | 1/1990 | Thelamon et al. | 267/140.1 |

FOREIGN PATENT DOCUMENTS 2833776 8/1978 Fed. Rep. of Germany .

Primary Examiner—Douglas C. Butler
Attorney, Agent, or Firm—Sprung Horn Kramer & Woods

[57] ABSTRACT

A hydraulically damped mount includes both a fluid overflow opening (6) and a damping opening (5) arranged in parallel between a fluid working chamber (4) and an equalizing chamber (7). In the overflow opening (6) there is provided a pressure relief valve (8) which can be activated by the differential pressure between the working chamber and the equalizing chamber. This valve contains a control element (10) and an opposing counter stop (11) which the control element can contact with a tight fit and which it can pass by in case of excess pressure. When inactive, the control element (10) is spaced apart from the counter stop (11) at such a distance that a contact with the counter stop (11) is impossible when acoustically active vibrations are introduced.

6 Claims, 3 Drawing Sheets

HYDRAULICALLY DAMPED MOUNT

BACKGROUND

The invention relates to a hydraulically damped mount or bearing comprising a mounting member and a support member which rest on one another and are interconnected by means of a resilient body. The resilient body is made of elastomeric material (e.g., rubber) and is disposed between the mounting member and the support member. The mounting member, the support member and the resilient body bound and define a working chamber and an equalizing chamber and provide at least one damping opening and at least one overflow opening between the working chamber and the equalizing chamber. A liquid is disposed in, and substantially fills the working chamber, the equalizing chamber and the damping opening and overflow opening. A pressure relief valve is arranged in the overflow opening for controlling the flow of the liquid therethrough in dependence upon the differential pressure between the working chamber an the equalizing chamber. The pressure relief valve comprises a valve control element and an opposing counter stop. The control element contacts and fits tightly against the counter stop to prevent liquid flow when the differential pressure is in a prescribed range. The control element bypasses the counter stop when the pressure is excessive.

A hydraulically damped mount of this type is known from German Patent Publication No. AS 2 833 776. The damping opening of this mount has a variable cross section and the pressure relief valve is provided with a control element which rests against the opposing counter surface when inactive. The properties of this mount are marginally satisfactory in relation to both the damping of low-frequency vibrations and the isolation of high-frequency vibrations.

SUMMARY OF THE INVENTION

It is an object of the present invention to further develop a hydraulically damped mount of this kind such that it exhibits a precisely defined damping action which is highly effective for vibrations in the low-frequency range, and which achieves a reduced dynamic hardness in the high-frequency range.

This object, as well as other objects which will become apparent from the description that follows, are achieved, according to the present invention, by configuring the valve control element such that, when it is inactive, it is spaced apart from the counter stop. In addition, the control element and the spacing from the counter stop are so adjusted and dimensioned with respect to each other that a mutual contact between the control element and the counter stop is impossible when acoustically effective vibrations of small amplitude and of a frequency of more than 30 Hz are introduced.

The hydraulically damped mount in accordance with the invention has a damping opening with a fixed (non-variable) cross section, which ensures that an optimum damping action is achieved in a certain frequency range. By varying the cross section, the frequency range can be shifted, as required, to another frequency range to control vibrations which require a high degree of damping, for example, those vibrations which may cause excessively high deflection amplitudes of the supported body due to resonance.

When inactive, the control element is spaced apart from the counter stop. With respect to their spatial expansion, the control element and this spacing distance are dimensioned such that a mutual contact between the control element and the counter stop is prevented when acoustic vibrations of small amplitudes and a frequency of more than 30 Hz. are introduced. When exposed to acoustically active vibrations, the pressure relief valve is thus always open to such an extent that there is no pressure build-up in the working chamber or the equalizing chamber. The spring body supporting the mounting piece and the support piece is not subject to additional load. This reduces the dynamic spring rate results in good isolation of the acoustically active vibrations.

The control element can be provided with a tongue-like protruding end that can contact the counter stop. Advantageously, it is made of an elastomeric material making the manufacture of the device particularly inexpensive. The counter stop of the control element can comprise two partial stoppers which essentially extend parallel to one another and are spaced apart from eaoh other in the direotion of flow. In this embodiment, the control element is disposed in the interstice formed by the spacing distance between the two partial stoppers and can therefore be moved in both flow directions in accordance with the invention.

In order to achieve a uniform damping and isolating action in both flow directions, it proved to be advantageous that the partial stoppers and/or the control element have a mirror-inverted configuration and be in a mirror-inverted association with one another when not exposed to vibrations.

A dual aotion of the pressure relief valve—that is, the abilitY to act in both directions—in accordance with the invention, can also be accomplished when the control element includes two partial elements spaced apart from one another in the direction of flow and when the counter stop is disposed in the interstice formed by the spacing between them and has two stopping surfaces facing the partial elements. This arrangement also allows obtaining a uniform action in both flow directions provided the partial elements and/or the counter stop have a mirror-inverted configuration and are in a mirror-inverted association with one another when not exposed to vibrations. The operation of the hydraulically damped mount in accordance with the invention can be described as follows:

In the hydraulically damped mount in accordance with the invention, low-frequency vibrations cause a pressure increase alternately in the working chamber and the equalizing chamber. Caused by the effect of the respectively higher pressure, there is an escape movement in the area of the elastically configured control element of the pressure relief valve pressing it rapidly and liquid-tight against the respective counter stop. The overflow opening is thus no longer available for displacement of liquid from the working chamber into the equalizing chamber and vice-versa. The liquid forced out of the chamber with the higher pressure is thus in its entirety displaced through the damping opening into the chamber with the lower pressure. This action involves a significant energy loss and serves the purpose of vibration damping. In the embodiment in accordance with the invention, the frequency range with good vibration damping can be determined in a particularly precise way by the counter stop for the control element of the pressure relief valve and by a defined cross section of the damping opening. It can hence be adjusted without problem to damp those vibrations which are particularly interfering.

When the hydraulically damped mount is exposed to high-frequency vibrations, the control element of the pressure relief valve is held stationary in its rest position or its relative movements are so minor that it does not reach the counter stop. The overflow opening is therefore always available to an extent sufficient to reduce the pressure increases in the working and the equalizing chambers. The introduction of high-frequency vibrations does thus not prompt disadvantageous pressure increases in the working and equalizing chambers. The hydraulically damped mount in accordance with the invention has therefore a substantially more favorable dynamic spring rate than that of the prior known arrangements.

In case of excess pressure, the control element of the hydraulically damped mount can pass by the opposing counter stop. The entire width of the overflow opening is thus available for pressure relief. The excess pressure is then reduced correspondingly fast thus achieving a good isolation of the relative movements which cause this excess pressure. These movements can include, for example, the shaking of a piston engine when the engine is either turned on or off, or when equipped with a piston engine drives over the edge of a curb.

Further features, objects and advantages of the present invention will become apparent from the following description taken in conjunction with the accompanying drawings.

DESCRIPTION OF THE PREFERRED EMBODIMENTS

Figure 1:
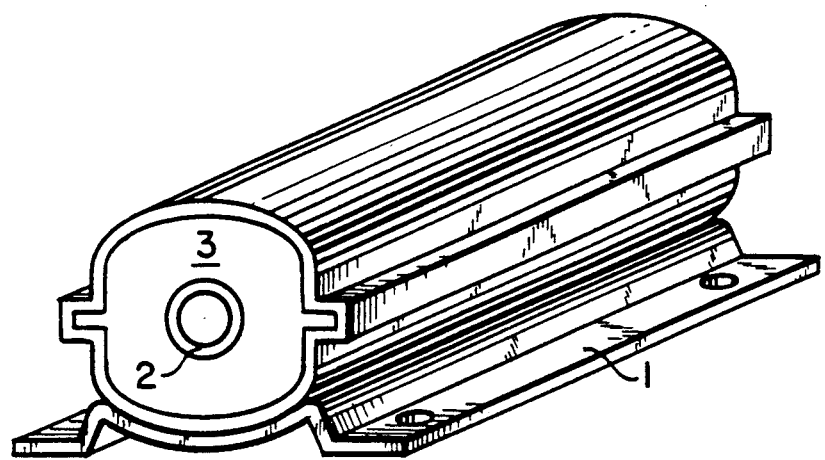
FIG. 1 is a perspective top view of a hydraulically damped mount according to the present invention.

The hydraulically damped mount of FIG. 1 has the form of a rubber cartridge spring. It is preferably used for supporting the internal combustion engine of a motor vehicle.

The hydraulically damped mount essentially comprises a metal mounting member 1 and a metal support member 2 which are supported on one another by means of a resilient body made of rubber. It can hence be used directly as shown.

In its interior, the rubber body of the hydraulically damped mount of FIG. 1 supporting the support member 2 on the mounting member 1 contains two liquid-filled hollow spaces the front sides of which are bounded by resilient walls 3 made of rubber. The two hollow spaces are disposed successively in direction of the introduced vibrations and they form the working chamber 4 and the equalizing chamber 7. These chambers are filled with liquid and joined via a damping opening 5. The latter is dimensioned such that the damping action is highly effective for vibrations in a low-frequency range of up to 30 Hz., at a maximum. This damping action is based on known effects.

Parallel to the damping opening 5, the represented embodiment has two overflow openings 6 between the working chamber 4 and the equalizing chamber 7. Each of these chambers contains one pressure relief valve 8 including a control element in the form of an elastically resilient valve flap rigidly attached at its base part. The end of this valve flap, which in the inactive, rest state shown protrudes in radial direction, is spaced apart from the counter stops by which it is preceded in direction of the working chamber 4 as well as in direction of the equalizing chamber 7. When high-frequency vibrations are introduced, the current can thus circumvent the valve flap of the represented hydraulic mount and said vibrations do not cause interfering pressure changes in either the working chamber 4 or the equalizing chamber 7. They are correspondingly isolated in an excellent way.

As opposed thereto, when low-frequency vibrations of a correspondingly large amplitude are introduced, the resulting elevated pressures cause the end of the valve flap to be displaced to such an extent that it alternately touches the two counter stops. The overflow opening 6 is blocked in each case such that, subsequently, liquid can be displaced only across the damping opening 5 from the chamber with the higher pressure into the chamber with the lower pressure. This prompts a precisely activated and highly effective damping action.

Figure 2:
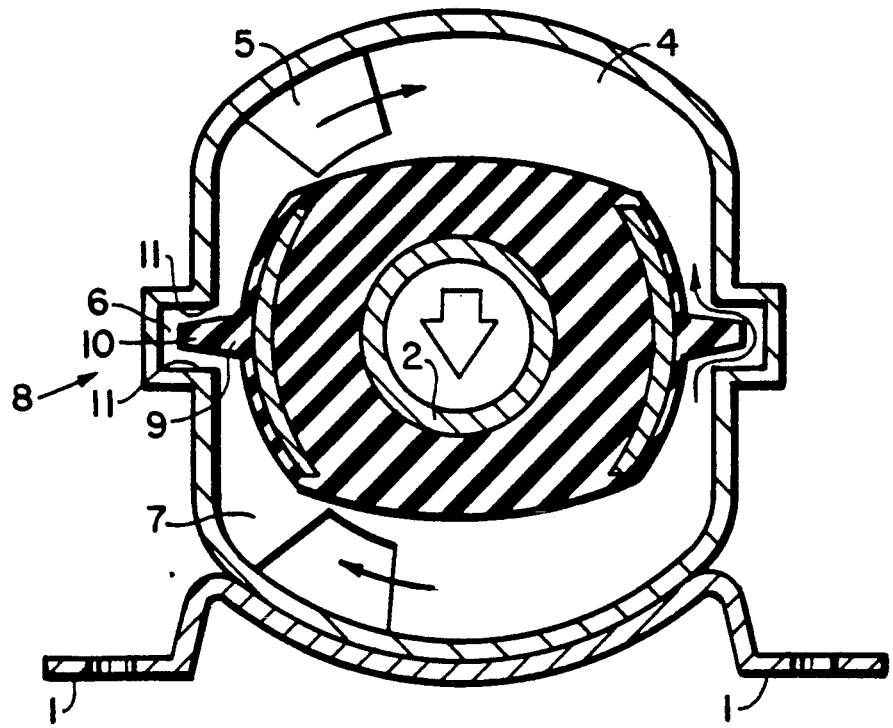
FIG. 2 is a transverse cross sectional view of the hydraulically damped mount of FIG. 1.
Figure 3:
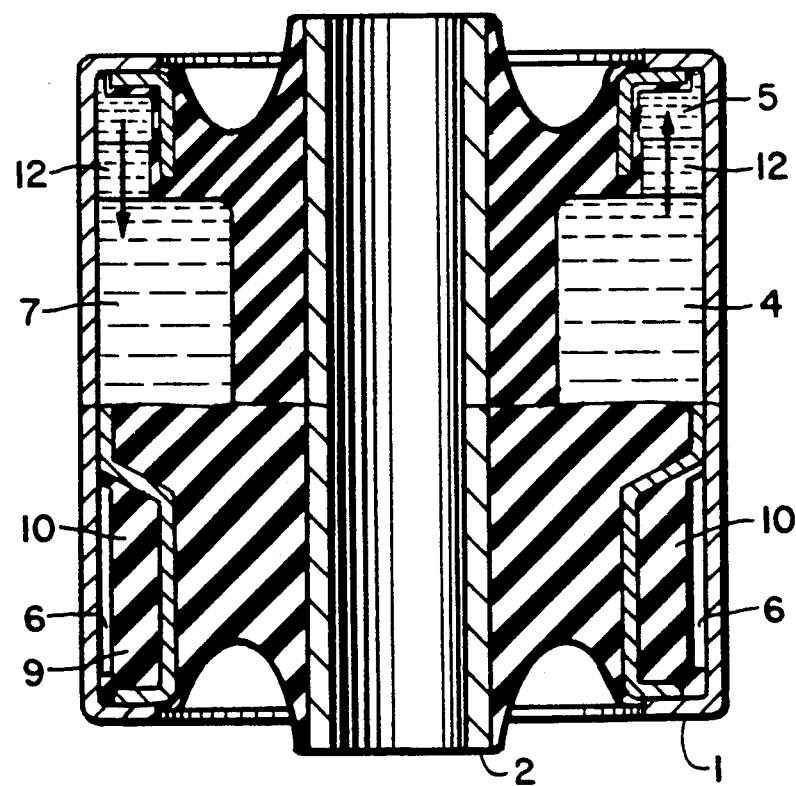
FIG. 3. is a longitudinal sectional view of the hydraulically damped mount of FIG. 1 taken along two different section planes.

FIG. 3 is a longitudinal cross section of the hydraulically damped mount of FIGS. 1 and 2, the section being made on two different sectional planes. The lower portion of the drawing shows the area of the hydraulically damped mount of FIG. 2 in which the flap valve is disposed. It can be seen that the elastically resilient valve flaps are rigidly attached in the radial direction at the inside and in the axial direction on both sides. They are attached by means of vulcanization to a metal carrier sleeve. As opposed thereto, the tongue-like configured end which protrudes in radial direction toward the exterior can freely move because of the differential pressures generated alternately between the working chamber and the equalizing chamber when vibrations are introduced. It is radially spaced-apart from the internal circumference of the annular mounting member 1. This spacing simultaneously functions as an overflow opening 6 across which liquid can be moved back and forth between the working chamber 4 and the equalizing chamber 7 when high-frequency vibrations are introduced.

Figure 4:
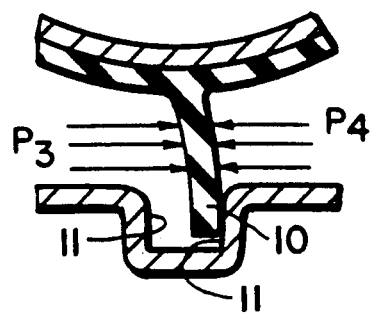
FIG. 4. is an enlarged cross sectional view of the hydraulically damped mount of FIG. 2 showing the region of the flap valve in detail.

The upper portion of the drawing of FIG. 3 illustrates the configuration of the damping opening 5. The latter has a channel-like configuration and is partly passed around the internal circumference of the sleeve-like configured mounting member. The inlet and outlet openings are formed by connecting channels 12 which extend in the axial direction. The working chamber 4 and the equalizing chamber 7, the connecting channels 12 and the damping opening 5 are completely filled with an incompressible, hydraulic liquid, preferably a mixture of glycol and water. FIG. 4 shows the pressure relief valve of the hydraulically damped mount of FIG. 2 in a particular position during operation. It represents the introduction of low-frequency vibrations causing an escape movement of the end of the tongue-like configured control element toward the chamber with the lower pressure. In the position shown, the direction is toward the chamber in which a pressure P4 prevails. In this particular case, the end of the tongue-like configured control element contacts the counter stop 11 thus closing the previously open overflow opening 6. Thereafter, the pressure increase in the chamber with the elevated pressure can only be compensated via the damping opening 5 (which is not represented in FIG. 4.) This compensating action involves a very effective damping which is desired, for example, for damping engine vibrations induced by the road.

Figure 5:
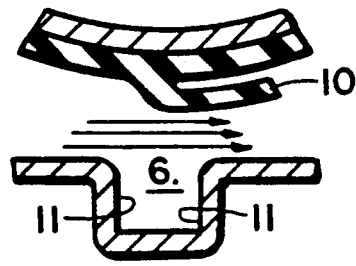
FIG. 5. is another view of the flap valve of FIG. 4 showing the valve flap in the relief position beyond the counter stop surface.

FIG. 5 illustrates the situation where there is an excess pressure in one of the chambers 4, 7; for the embodiment represented, this is on the left side of the drawing. In this particular case, the excess pressure forces an escape of the tongue-like control element causing the latter to pass over the counter stop 11 and opening the overflow opening 6 in its entirety. The excess pressure can thus spontaneously be compensated without a damping action occurring. A corresponding effect is desired particularly with respect to avoiding noises that can be caused by shaking when a piston engine is started or when the respective vehicle drives over a curb or similarly rough, irregular surfaces.

Figure 6:
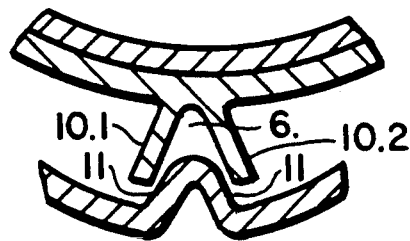
FIG. 6 an enlarged cross sectional view of another preferred embodiment of the flap valve.

The action of the pressure relief valve of FIG. 6 is essentially the same as the one described above. It does, however, have a different design, in particular the end of the tongue-like control element 10 is parted transversely to the direction of flow. The ends thereof thus comprise two partial elements 10.1 and 10.2. A counter stop 11 is disposed in the interstice between the two partial elements and has two stopping surfaces facing the two partial elements. When inactive and at rest, as represented in the drawing, these stopping surfaces are also spaced apart from the partial elements. This distance remains substantially unchanged to a greater or lesser extent when high-frequency vibrations are introduced. When exposed to low-frequency vibrations, the partial elements 10.1, 10.2 alternately contact the counter stop 11 thus blocking the overflow opening 6. This results in a highly effective damping action making use of known effects.

Suddenly occurring excess pressures, however, cause the partial element 10.1 or 10.2 facing the chamber with the higher pressure to snap over the previously contacted counter stop 11 thus leading to a spontaneous pressure relief and a good isolation of respective pressure surges. There has thus been shown and described a novel hydraulically damped mount which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. A hydraulically damped mount comprising, in combination:
   (a) a mounting member;
   (b) a support member;
   (c) a resilient body, made of elastomeric material and disposed between said mounting member and said support member, for supporting said mounting and support members with respect to each other, said mounting member, support member and said resilient body bounding and defining a working chamber and an equalizing chamber and providing at least one damping opening and at least one overflow opening between said working chamber and said equalizing chamber;
   (d) a liquid disposed in and substantially filling said working chamber, said equalizing chamber, said damping opening and said overflow opening; and
   (e) a pressure relief valve arranged in said overflow opening for controlling the flow of liquid therethrough in dependence upon the differential pressure between said working chamber and said equalizing chamber, said pressure relief valve comprising stop means forming a valve seat and valve control element means arranged to cooperate with said stop means, said valve control element means being configured and arranged:
      (1) to fit tightly against said stop means to prevent the flow of liquid through said overflow opening when said differential pressure is less than a prescribed value;
      (2) to pass by said stop means to permit the flow of liquid through said overflow opening when said differential pressure exceeds said prescribed value; and
      (3) to remain spaced apart from said stop means, in its inactive, rest position, to permit the flow of liquid through said overflow opening when said differential pressure consists of small amplitude acoustic vibrations having a frequency greater than 30 Hz.

2. The hydraulically damped mount defined in claim 1, wherein said control element means comprises a tongue-like protruding end which rest against the stop means.

3. The hydraulically damped mount defined in claim 1, wherein said stop means comprises two partial end stops which essentially extend parallel to one another and are spaced apart from one another in flow direction and in that the control element means is disposed in the interstice formed by the spacing between the partial end stops.

4. The hydraulically damped mount defined in claim 3, wherein at least one of the partial end stops and the control element means have a mirror-inverted configuration and are in a mirror-inverted association with one another during situations when there are no vibrations.

5. The hydraulically damped mount defined in claim 1, wherein the control element means comprise two partial elements wherein these partial elements, are spaced apart from one another in flow direction, and wherein the stop means is disposed in the interstice formed by the spacing and has two stopping surfaces facing the partial elements 6. The hydraulically damped mount defined in claim 5, wherein at least one of the partial elements and the stop means have a mirror-inverted configuration and are in a mirror-inverted association with one another during situations when there are no vibrations.

* * * * *